Oct. 13, 1936.    C. C. FRANCIS ET AL    2,056,940
HYDRAULIC BRAKE SYSTEM
Filed Feb. 10, 1933
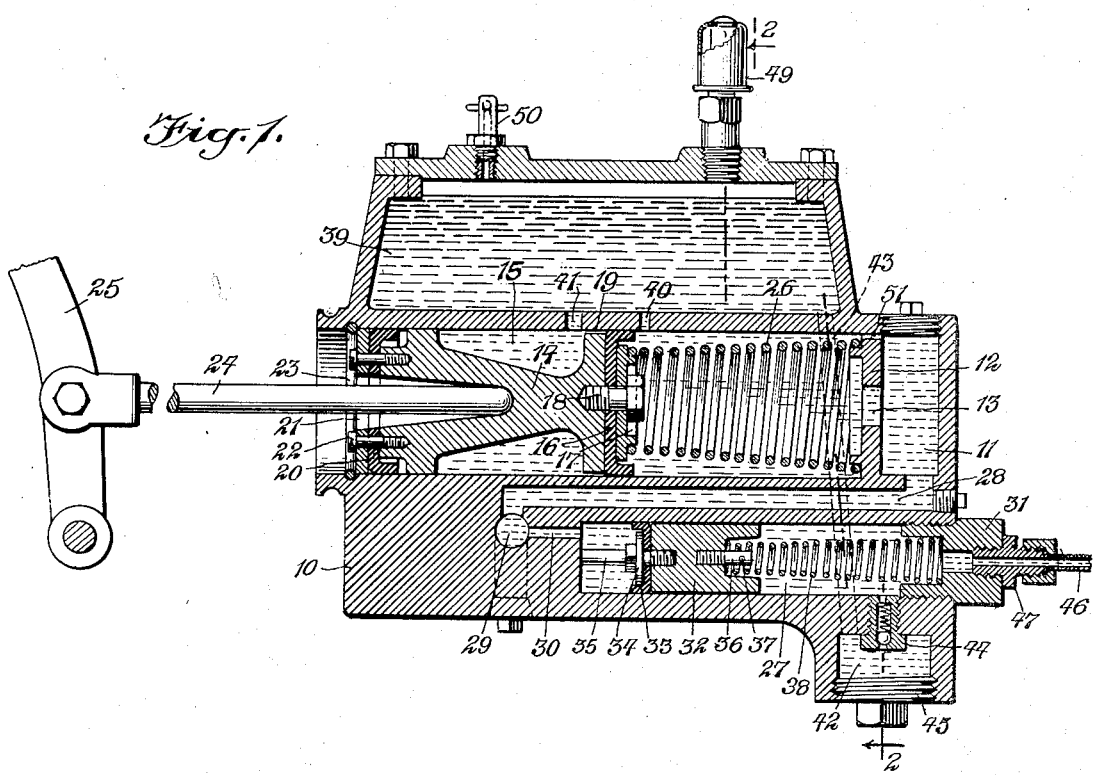
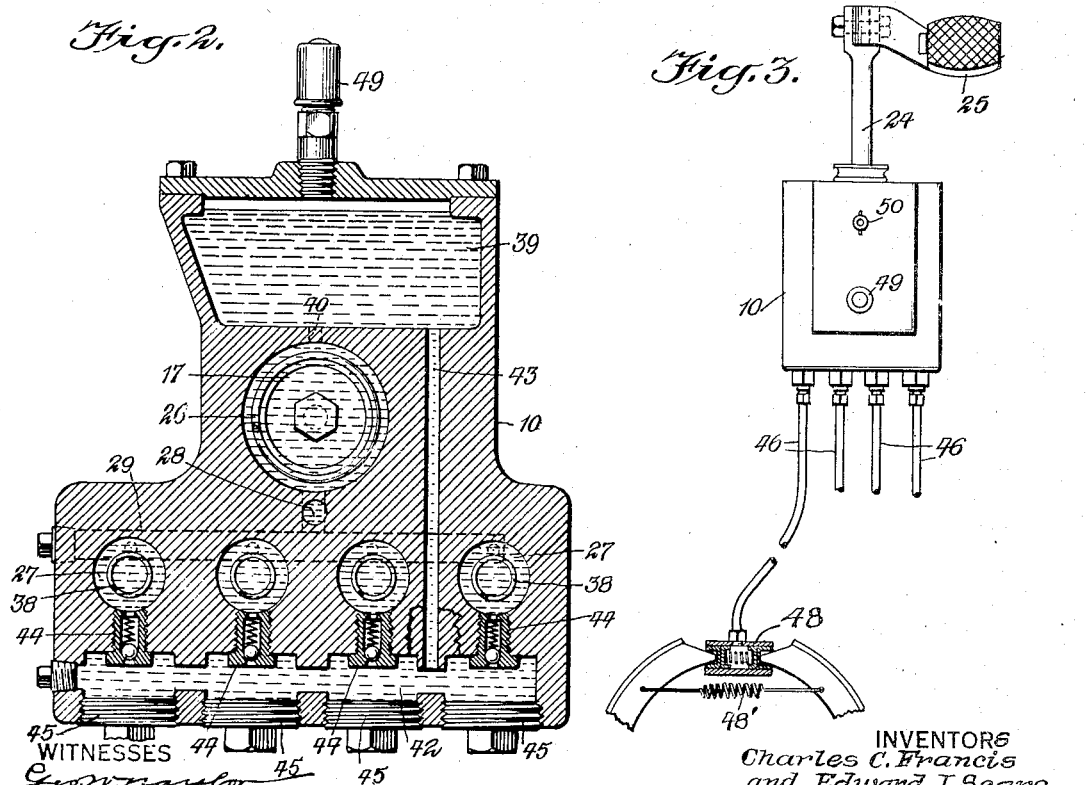

Patented Oct. 13, 1936

2,056,940

UNITED STATES PATENT OFFICE 2,056,940

HYDRAULIC BRAKE SYSTEM

Charles C. Francis, New York, and Edward J. Sears, Woodside, N. Y.

Application February 10, 1933, Serial No. 656,162

2 Claims. (Cl. 60—54.5)

This invention relates to a fluid pressure or hydraulic multiple-brake system which may be used advantageously in conjunction with the wheel brakes of motor vehicles.

The type of brake system of the present invention includes a master cylinder having a manually operated piston therein for producing fluid pressure, which is imposed on auxiliary pistons which in turn transmit the fluid pressure through conduits to the wheel brake cylinders forming parts of the brake shoe actuating mechanisms.

Some of the objects and advantages of the present brake system are: Each of the wheel brake cylinders has a separate fluid or pressure conduit leading thereto, and any leak therein will not affect the others so far as brake application and brake release are concerned; the leaking or bleeding of one conduit will not result in the drainage and loss of liquid of the entire system; the system may be quickly and conveniently supplied with liquid at the time of installation or after repairs have been made or the brakes have been overhauled; eliminates unnecessary valves and pressure tanks; and eliminates depressions or voids in the system by allowing possible air within the system to escape.

Another important object of the invention is the provision of means to compensate for variations or deficiencies in the quantity and speed of the return flow of the liquid on the brake sides of the auxiliary pistons, particularly those variations or deficiencies which result from leaks and changes in atmospheric temperature, to the end that there will be a quick recovery in the system so that the brakes may be operated repeatedly at short intervals, if necessary.

With the foregoing and other objects in view, the invention resides in the particular provision, relative disposition and functions of the parts hereinafter fully described and illustrated in the accompanying drawing, in which Figure 1 is a vertical longitudinal section showing the master cylinder and its piston, and one of the auxiliary cylinders and its piston, and the fluid reservoir;

Figure 2 is a section taken approximately on the line 2—2 of Figure 1;

Figure 3 is a diagrammatic plan view with certain parts shown in section.

Referring now more particularly to the several views of the drawing, it will be apparent that there is shown a casting or suitable body 10, which is bored to provide a master cylinder 11, there being a wall or partition 12 within the cylinder 11 spaced from the outlet end of the cylinder, and said partition having an opening 13 therein. This partition forms a chamber separate from the cylinder proper. A master piston 14 is arranged for movement in the cylinder 11. The piston 14 has an annular recess 15 which provides a supplemental liquid reservoir between the ends of the piston 14. The piston 14 has a leather cup 16 on one end thereof which is secured in place by the employment of a disk 17 and fastening element 18. The piston 14 has grooves, or it may be reduced in size as at 19 directly behind the cup 16 to by-pass liquid, for a purpose to be explained hereinafter. The opposite or outer end of the piston 14 has secured thereto an annular leather cup 20, said cup being held in place by an annular member 21 and fastening elements 22. A stop in the form of a lock wire 23 disposed in a groove in the wall of the cylinder 11 limits the return movement of the piston 14.

The piston 14 is manually operated by a push rod 24 connected with a pedal 25. By operating the pedal 25 the piston 14 will be moved toward the outlet end of the cylinder 11 to produce pressure which is transmitted, for a purpose to be explained. A spring 26 is arranged within the cylinder 11 between the partition 12 and the piston 14 to cause the return movement of the piston when pressure on the pedal 25 is withdrawn. The body 10 is bored to provide a plurality of auxiliary cylinders 27, there being four cylinders 27 to correspond to the four wheel brakes of an automobile.

The body 10 also has a passage 28 therein, which leads from the outlet end of the cylinder 11 to a transversely extending liquid-collecting or equalizing chamber 29 in the body 10, and said chamber 29 communicates with the inlet ends of the cylinders 27 by inlet passages 30. The outlet end of each cylinder 27 has an outlet bushing 31. An auxiliary piston 32 is movable in each cylinder 27, the same being somewhat smaller in diameter than the cylinder 27, or grooved to by-pass liquid, for a purpose to be explained. The piston 32 has a leather cup 33 which is secured thereto by a disk 34 and screw element 35, the latter also serving as a stop engageable with the adjacent end wall of the cylinder 27 to limit the return movement of the piston 32. The piston 32 has a stem 36 provided with a transverse pin 37 for removing the piston 32 from the cylinder in case repairs are necessary. A return spring 38 is arranged in each cylinder 27 between its piston 32 and outlet bushing 31, to cause the return movement of the piston 32 when pressure on the master piston 14 is released or withdrawn.

A reservoir 39 is formed in the body 10 above the master cylinder 11, and contains the fluid or liquid serving as a pressure transmitting medium for the system. A compensating relief port 40 establishes communication between the reservoir 39 and the master cylinder 11. A secondary liquid port 41 establishes communication between the reservoir 39 and the supplemental reservoir provided by reason of the annular recess 15 in the piston 14.

In accordance with the invention, the body 10 has formed therein a chamber 42 extending transversely beneath the outlet ends of the auxiliary cylinders 27. The chamber 42 is in communication with the reservoir 39 by a passage 43 in the body 10, so that liquid under atmospheric pressure will find its way by gravity flow into the chamber 42 from the reservoir 39. The outlet end of each auxiliary cylinder 27 is in communication with the chamber 42 by a check valve 44 secured in a tapped bore in the body 10. Removable plugs 45 screwed into the body 10 enable the insertion or removal of the valves 44. Each of the valves 44 allows liquid to flow into the related cylinder 27 upon return movement of the piston 32 therein, and prevents return flow of the liquid from the cylinder 27 to the chamber 42.

The outlet end of each auxiliary cylinder 27 is connected with a wheel brake cylinder forming a part of the brake shoe operating mechanism, and this is accomplished by the provision of a conduit or tubing 46 which is connected with the outlet bushing 31 of the cylinder 27 by a male adaptor 47. The brake wheel cylinder forming a part of the brake shoe operating mechanism is illustrated in Figure 3 and designated 48.

The system is filled with liquid in a manner presently to be explained, and the reservoir 39 is provided with a vent plug 49 and a filling connection 50 for that purpose. The liquid used may be of any preferred kind, such as a mixture of castor oil and alcohol. The vent plug 49 is removed and the reservoir 39 is filled with the liquid after which the plug 49 is replaced and closed against passage therethrough. A pressure gun is filled with liquid and is connected with the filling connection 50. Pressure is applied to the gun and liquid will then fill the master cylinder 11 through the port 40, and will fill the supplementary reservoir 15 through the port 41. Liquid will flow from the cylinder 11 through the passage 28 into the chamber 29, filling the latter, and will flow from said chamber 29 into the inlet ends of the cylinders 27 through the passages 30. At the same time liquid will flow through the passage 43 from the reservoir 39 to the chamber 42 and the liquid will pass through the four check valves 44 into the cylinders 27 on the brake sides of the pistons 32, and liquid will also find its way into the conduits or tubing 46 filling the latter, and also the brake cylinders 48. It is understood that each brake cylinder has a bleeder screw which may be removed to allow air, which is forced ahead of the liquid, to flow out or escape. Any air which might possibly be in the cylinders 27 will be forced to the highest point in the reservoir 39. The wall 12 has a port 51 to allow the escape of any air which may be trapped in the chamber at the end of the master cylinder 11, and this air will pass into the reservoir 39 through the port 40, and will pass through the liquid out through the vent plug 49.

The plug 49 keeps the air in the reservoir 39 above the liquid therein at atmospheric pressure, and allows the liquid to readily pass through the ports 40 and 41 into the master cylinder 11 and supplemental reservoir 15. Therefore, the passage 28, chamber 29, passages 30 and auxiliary cylinders 27 at the inlet sides of the pistons 32 will always be filled with liquid.

When pressure is applied to the pedal 25 the master piston 14 is forced ahead in the cylinder 11, creating pressure on the liquid in advance of the piston 14, which is transmitted to the auxiliary pistons 32. This will force liquid in advance of the pistons 32 through the conduits or tubing 46 to the brake cylinders 48, causing application of the brakes. When pressure on the pedal 25 is released or withdrawn, the spring 26 causes the return movement of the master piston 14 and the springs 38 cause the return movement of the auxiliary pistons 32.

It is to be understood that the return movement of the auxiliary pistons 32 by the springs 38 is independent of the re-action pressure of the springs 48' adjacent the brake cylinders 48 upon the release of the brakes. When the pressure on the pedal 25 is withdrawn, the pistons 32 will return very rapidly by the pressure exerted by the springs 38. This will cause additional liquid to enter the cylinders 27 if necessary on the outlet sides of the pistons 32, through the valves 44 from the chamber 42 with the assistance of the liquid in the reservoir 39. The cup 33 on the end of piston 32 faces in the reverse direction to the braking movement of the piston, that is, it opens into the receiving end of the cylinder which connects with the master cylinder. Under pressure from the master cylinder it seals on the forward or braking movement. It also seals on the releasing movement under spring 38 to cause suction through valve 44. The piston 32 has a clearance in the cylinder to permit excess oil and air to flow past the piston and the cup as the pressure in the master cylinder is released.

The liquid drawn from the reservoir 39 is replaced by air which enters the reservoir through the plug 49. By this action every time the brakes are applied liquid will enter the auxiliary cylinders 27 which automatically keeps the master cylinder 11 and the auxiliary cylinders 27 filled with liquid at all times, regardless of variations or deficiencies due to expansion and contraction of the liquid on account of temperature changes.

Any excess liquid thus introduced into the system at the brake sides of the auxiliary pistons may flow past the pistons 32 and their cups 33, back to the reservoir 39 through the passages connecting the master cylinder with the auxiliary cylinders. The additional liquid allowed to enter the system through the check valves 44 also compensates for any retardation in the return flow of the liquid in the tubing 46 when the brakes are released, thereby avoiding depressions or voids in the system. It follows that it will be possible to apply the brakes repeatedly at short intervals.

Attention is called to the fact that if a break should occur in any one of the conduits or tubing 46 leading to the wheel brake cylinders the liquid from the connected auxiliary cylinder would not escape through the broken conduit because the related valve 44 would check the liquid from escaping through the chamber 42 from the other conduits or tubing. The only loss of liquid in case of a break in one of the conduits 46 would be the liquid in that particular conduit. Air being admitted to that particular conduit would prevent the particular valve 44 from operating on the return movement of the related auxiliary piston 32.

Attention is also called to the fact that by reason of the employment of the springs 38 it is unnecessary for the manual addition of liquid to the system and automatically provides for the addition of such liquid to the auxiliary cylinders 27 and the brake conduits or tubing 46, as is necessitated by normal losses due to a slow leak, evaporation or contraction of the liquid due to temperature changes. The liquid will always be maintained at the proper volume even under extreme temperature changes.

The piston 32 will be allowed to return in a quick and proper manner by the admission of liquid into the outlet ends of the cylinders. Consequently the pedal 25 will have no lost motion. The springs 38 also prevent the pistons 32 from creeping along in the cylinders 27 and stopping the flow of liquid to the conduits 46. As before stated, any excess liquid in the system beyond the pistons 32 will pass by the pistons 32, thereby equalizing the pressure applied to the brake shoe, and this action is supplemented by the provision of the chamber 29 which serves as a pressure equalizer for the cylinders 27.

If any excess fluid should be injected in brake conduits by the piston 32 acting as a pump it would be forced back by spring 48' as soon as pressure on brake pedal is released. Excess of liquid is forced past piston 32 which may be grooved then by leather cup which allows fluid to pass in that direction to reservoir 39. The action of the springs on the brake shoe ends which connect with the pistons in the cylinders, is to force the fluid back through the brake conduits and at the same time release the brakes when not in action.

The braking system of this invention is for retarding the car when running and is not intended for holding the car braked after it has been stopped. The brakes are operated by the foot pedal and are promptly released as the pressure on the foot pedal is released. It is impossible to lock the brakes in the application position if the system is over charged with the braking fluid due to the release of the pressure past the piston 32.

What we claim is:

1. In a hydraulic braking system, the combination, a master cylinder with a piston, a spring for retrieving said piston, a plurality of auxiliary cylinders, a brake cylinder operatively connected with the delivery end of each auxiliary cylinder, a passage connecting said master cylinder with the receiving end of each of said auxiliary cylinders, a piston in each auxiliary cylinder fitting the cylinders with a loose clearance and subject to the pressures in both ends of said cylinder, a cup on the inward end only of said piston facing the receiving end of the cylinder, a spring for retreiving the piston acting on the outward end of the piston, a source of liquid supply and a check valve connecting said source with the delivery end of said auxiliary cylinder.

2. In a hydraulic braking system, the combination, a master cylinder with a piston, a plurality of auxiliary cylinders each having an operating piston fitting the cylinder with a loose clearance, a passage connecting the master cylinder with the receiving end of each auxiliary cylinder, a conduit connecting the delivery end of each auxiliary cylinder with a braking cylinder, a spring for retrieving the piston in each auxiliary cylinder said piston being subject to the pressures in both ends of the cylinder and a cup seal for the end of the piston only which faces the receiving end of the cylinder for sealing the piston during the working stroke with a yieldable seal.

CHARLES C. FRANCIS.
EDWARD J. SEARS.